2,766,301
PRODUCTION OF TRICYCLODECANE

Karl Büchner, Duisburg-Hamborn, Otto Roelen, Oberhausen-Holten, and Josef Meis, Oberhausen-Osterfeld, Germany, assignors to Ruhrchemie Aktiengesellschaft, Oberhausen-Holten, Germany No Drawing. Application April 22, 1954,
Serial No. 425,052

6 Claims. (Cl. 260—666)

This invention relates to new and useful improvements in the production of tricyclodecane. The invention more particularly relates to the production of pure tricyclodecane ($C_{10}H_{16}$) from dicyclopentadiene.

It is known that tricyclodecane may be produced from dicyclopentadiene by treatment with hydrogenation catalyst. This results in a product which boils at 193° C.

One object of this invention is the production of a considerably purer tricyclodecane from dicyclopentadiene. This, and still further objects, will become apparent from the following description:

It has now been found that tricyclodecane of considerably higher purity which boils at a constant temperature of 188.8° C. at 770 mm. mercury, may be obtained by hydrogenating dicyclopentadiene in the presence of a hydrogenation catalyst, separating a fraction boiling between 188 and 190° C. from the reaction product and sublimating this fraction at a temperature below its boiling point. The dicyclopentadiene used as the starting material is obtained by polymerization and subsequent fractionation of the first runnings resulting in the distillation of coke oven benzene. Dicyclopentadiene boils at about 170° C. under normal atmospheric pressure, but undergoes a slow decomposition while boiling. Distillation of dicyclopentadiene with no decomposition being encountered is possible at a pressure of 35 mm. Hg and a temperature of about 88° C.

Dicyclopentadiene generally has the constitution of a crystalline slurry, but sometimes it forms solid crystals. The composition of dicyclopentadiene corresponds to the formula $C_{10}H_{12}$. The scientific structural formulae of the respective compounds according to the "Bayer Plan" are: Tricyclodecadiene-4,8-[5,2,1,0$^{2,6}$] and tricyclodecane [5,2,1,0$^{2,6}$].

The hydrogenation may be effected at normal or elevated temperatures of as high as 150° C. with hydrogen using any conventional hydrogenation catalyst and preferably with a nickel magnesia kieselguhr catalyst. The hydrogenation is effected under normal atmospheric pressure or at elevated pressures of as high as about 30 kg./square centimeter until the hydrogenation product has an iodine number of zero to not more than 1 as determined by the Kaufmann method. Pressures in excess of 30 kg./sq. cm. may also be used; this increase in pressure, however, generally offers no advantage.

The hydrogenation catalysts used are employed in amounts of 2 to 10% by weight of the starting material being hydrogenated. The hydrogenation is suitably effected at a temperature below that where decomposition of dicyclopentadiene occurs, i. e. below 150° C. For this reason, it is not possible to use hydrogenation catalysts, the hydrogenating action of which is not developed until temperatures in excess of 200° C. are reached. Catalysts which, for example, consist of metal oxides or metal sulfides are not suited to the hydrogenation of dicyclopentadiene. Catalysts which contain metallic nickel are preferably used. A catalyst produced by precipitation from nickel salt solutions and containing 50 parts by weight of kieselguhr and 12 parts by weight of magnesia per 100 parts by weight of nickel is particularly advantageous because it is possible by means of the same to start the hydrogenation at a temperature of as low as room temperature. The fraction boiling between 188 and 190° C., which constitutes a large majority of the reaction product, may be separated by distillation, and this fraction sublimated with the use of an inert substantially nitrogen-free gas, and preferably carbon dioxide, at a temperature below its boiling point.

The sublimation of tricyclodecane occurs at as low as normal room temperature. A sublimation of this kind, however, would take an excessively long time. To obtain a better space-time yield, the sublimation temperature is preferably increased to a level close below the boiling point of tricyclodecane. The boiling point of tricyclodecane is approximately 188–189° C. The sublimation of the tricyclodecane is most suitably effected at temperatures ranging between 120 and 160° C.

In the operation of the process, the dicyclopentadiene, such as a commercial grade dicyclopentadiene, having a pour point of +19° C. and an ozone iodine number of 395, is placed in an autoclave together with 10% by volume (corresponding to 3.2% by weight) of a nickel-magnesia-kieselguhr catalyst containing 12 parts MgO and 50 parts of kieselguhr per 100 parts by weight of nickel. Hydrogen is passed into the autoclave under a pressure of about 20 atmospheres, while stirring the dicyclopentadiene. The absorption of the hydrogen commences at a temperature of as low as room temperature, while the temperature of the reaction product continuously increases. The hydrogen pressure is continuously made up until a pressure decrease no longer occurs, and a sample shows a Kaufmann iodine number of 0 to 1.

The reaction product is then separated from the catalyst by filtration, which must be effected at temperatures of 80–85° C., since the product solidifies at about 75° C. The reaction product is then subjected to a fractional distillation. A few percent of a low-boiling, freely flowing liquid, which, according to its characteristics has been identified as cyclopentane, is obtained as first runnings in most cases. The presence of other cyclic or mixed hydrocarbons in the first runnings is also possible. The main fraction which amounts to about 85–90% consists of a compact crystal mass which, at 770 mm. mercury, has a boiling interval of 188–189° C. In order to produce a constant boiling point product this distillate is subjected to a sublimation.

For this purpose the mass to be sublimed may be heated to about 130° C. and a gas stream be blown thereover. This gas stream drives the slowly evaporating product into a cooled receiver, where it solidifies, forming well-shaped, glittering, pure white compact crystals which have a melting point of 75° C. The sublimate has a constant boiling temperature of 188.8° C., which does not change even after heating for prolonged periods of, for example, an excess of six hours.

Nitrogen, or nitrogen-containing gases should not be used for the sublimation, for small amounts of amines, which are perceptible by an odor of lower amines are formed in the presence of nitrogen. The preferable inert gas for the sublimation has been found to be carbon dioxide, by means of which tricyclodecane having an unobjectionable odor of camphor is obtained.

The tricyclodecane is valuable, for example, in analytical chemistry as a pure hydrocarbon of constant boiling point.

The following examples are given by way of illustration and not limitation:

*Example 1*

20 liters of commercial-grade dicyclopentadiene and 2 liters of a reduced nickel-magnesia-kieselguhr catalyst containing 12 parts MgO and 50 parts of kieselguhr per 100 parts by weight of nickel were placed in an autoclave of 30 liters' capacity provided with a stirrer and cooling coil. After having closed the autoclave, the air was removed by purging with hydrogen from a cylinder, and then a hydrogen pressure of 20 atmospheres was imposed on the autoclave. When starting the stirrer, a slow absorption of hydrogen began, while the temperature of the product gradually increased. After about 5 hours, the absorption of hydrogen was terminated and the temperature had finally increased to about 150° C.

In the course of the hydrogenation, water cooling had to temporarily be used to remove the heat of the reaction. A sample taken after a treating period of 5 hours showed a Kaufmann iodine number of zero.

The content of the autoclave was then cooled to about 100° C. and the catalyst, with the stirrer stopped, settled at the bottom. The product was separated from the catalyst by means of a filter candle and fractionated from a distilling vessel of 30 liters' capacity provided with a column of 50 cm. length packed with Raschig rings. This resulted in the following fractions:

| | Percent by volume |
|---|---|
| 60°–180° C | 3 |
| 180–188° C | 5 |
| 188°–190° C | 86 |
| Residue 190° C | 5 |

The main fraction boiling between 188 and 190° C. was transferred into a round-bottomed glass flask of 2 liters capacity provided with an angular neck, which extended into a flask of 6 liters' capacity. Here the material was heated to 130° C. with a weak flame. A carbon dioxide stream of about 20 liters per hour was blown through a side nozzle on the surface, while the 6-liter flasks used as receivers were cooled with water. In this manner, about 100 grams per hour of tricyclodecane could be obtained as sublimate per flask.

*Example 2*

Instead of a reduced nickel-magnesia-kieselguhr catalyst a copper catalyst was employed for the hydrogenation of the reaction mixture used in Example 1. This catalyst had been prepared from a solution which contained 100 parts by weight of copper and 10 parts by weight of calcium in the form of their nitrates. These nitrates were precipitated by means of a soda solution while simultaneously stirring in 100 parts by weight of kieselguhr. The precipitate separated from the solution was dried and reduced with hydrogen at a temperature of 180–200° C.

With this catalyst, the hydrogenation was effected in the manner set forth in Example 1. The absorption of hydrogen commenced at a reaction temperature of 40° C. and was terminated after 4 hours. In the course of the hydrogenation the temperature increased to about 160° C. The processing of the hydrogenated products was effected in the manner set forth in Example 1. Thereby, 85% of the starting material was obtained in the form of a fraction which boiled between 188 and 189° C. and consisted of crude tricyclodecane. The raw product, similar to that of Example 1, was sublimated in partial quantities of about 1000 grams at 140° C. passing over argon at a rate of 20 liters/hr.

*Example 3*

The hydrogenation was effected with a catalyst which contained 100 parts by weight of cobalt, 10 parts by weight of magnesia, 2.5 parts by weight of thoria and 200 parts by weight of kieselguhr as being conventional for the catalytic hydrogenation of carbon monoxide by the Fischer-Tropsch process. 200 cc. of dicyclopentadiene and 40 cc. of the catalyst mentioned above were placed in a shaking autoclave of 500 cc. capacity. Then an initial hydrogen pressure of 152 kg./square centimeter was imposed on the autoclave. The absorption of hydrogen commenced at a temperature of as low as 110° C. The heating of the autoclave was now discontinued. Due to the evolving hydrogenation heat, the temperature of the reaction mixture increased to 158° C.

The absorption of hydrogen was only slow at the beginning, then became relatively rapid and slackened again towards the end of the hydrogenation. Within 90 minutes, the hydrogenation was completely terminated. Within the first 20 minutes, 20% of the total hydrogen required for the hydrogenation was absorbed. Within further 5 minutes, another 20% of the hydrogen required for the hydrogenation was absorbed. The remainder of the hydrogen was consumed within further 65 minutes. At the end of the absorption of hydrogen a gas pressure of 132 kg./square centimeter was observed.

The hydrogenated product had the following characteristics:

| | |
|---|---|
| Iodine number | 1 |
| Molecular weight: | |
| Determined | 134 |
| Calculated | 136 |
| Melting point: | |
| Determined °C | 97 |
| Value according to literature °C | 77 |

The processing of the reaction product by sublimation was effected in the same manner as described in Examples 1 and 2.

We claim:

1. A process for the production of pure tricyclodecane, which comprises hydrogenating dicyclopentadiene at a temperature not substantially in excess of about 150° C. in the presence of a hydrogenation catalyst active at said temperature until the iodine number of the hydrogenation reaction product formed substantially disappears, separating a fraction boiling between about 188° and 190° C. from the hydrogenation reaction product, sublimating this fraction at a temperature below its boiling point with an inert, substantially nitrogen-free gas, and recovering pure tricyclodecane.

2. A process in accordance with claim 1, in which said hydrogenation is effected with a catalyst comprising magnesia, kieselguhr, and a metal selected from the group consisting of nickel and cobalt.

3. A process in accordance with claim 1, in which said separating of the fraction boiling between about 188° and 190° C. is effected by filtration at a temperature of 80°–85° C.

4. Process according to claim 2, in which said hydrogenation is effected with a nickel-magnesia-kieselguhr catalyst.

5. Process according to claim 1, in which said hydrogenation is effected at a temperature ranging from about normal temperature to 150° C.

6. Process according to claim 1, in which said sublimation is effected with carbon dioxide.

References Cited in the file of this patent

UNITED STATES PATENTS 1,903,850   Peters _____ Apr. 18, 1933

OTHER REFERENCES

"Chemisches Central Blatt," vol. II (1903), page 989.
Faraday's Encyclopedia of Hydrocarbon Compounds, vol. 6 ($C_{10}H_{16}$), page 10162.00.11.
"Chemistry and Utilization of Cyclopentadiene," Wilson et al., Chemical Reviews, vol. 34, No. 1, February 1944, pages 1 to 49.